US012307574B2

(12) United States Patent
Cappiello et al.

(10) Patent No.: US 12,307,574 B2
(45) Date of Patent: *May 20, 2025

(54) VISUALIZER FOR SWIMMING POOLS

(71) Applicant: Latham Pool Products, Inc., Latham, NY (US)

(72) Inventors: Will Cappiello, Latham, NY (US); Joel Culp, Latham, NY (US); Scott Mocha, Latham, NY (US); Scott Reynolds, Latham, NY (US)

(73) Assignee: Latham Pool Products, Inc., Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,587

(22) Filed: May 31, 2024

(65) Prior Publication Data

US 2024/0320898 A1  Sep. 26, 2024

Related U.S. Application Data

(63) Continuation of application No. 18/131,231, filed on Apr. 5, 2023, now Pat. No. 12,026,821, which is a
(Continued)

(51) Int. Cl.
*G06T 15/04* (2011.01)
*G06F 30/13* (2020.01)
(Continued)

(52) U.S. Cl.
CPC .............. *G06T 15/04* (2013.01); *G06F 30/13* (2020.01); *G06Q 50/08* (2013.01); *G06Q 50/16* (2013.01); *G06T 15/20* (2013.01); *G06F 2111/16* (2020.01)

(58) Field of Classification Search
None
See application file for complete search history.

(56) References Cited

U.S. PATENT DOCUMENTS 9,799,134 B2    10/2017  Haveman
10,049,493 B1   8/2018   Verizzo et al.
(Continued)

FOREIGN PATENT DOCUMENTS

FR         2908543         5/2008

OTHER PUBLICATIONS

"Coverstar, Automatic Safety Covers & Pool Studio", Available Online at: http://coverstarllc.blogspot.com/2013/05/coverstar-automatic-safety-covers-pool.html, May 24, 2013, 2 pages.
"Pool Studio—Pool Design Software—Overview (Old Version)", Available Online at: https://www.youtube.com/watch?v=EOSh56Km2v4, Mar. 10, 2018, 3 pages.
(Continued)

*Primary Examiner* — Michael J Cobb
(74) *Attorney, Agent, or Firm* — Kilpatrick Townsend & Stockton LLP

(57) ABSTRACT

Swimming pools can be visualized according to some aspects described herein. In one example, a system can receive a user selection of a particular liner from among a plurality of liner options for a virtual swimming pool. The system can generate a virtual swimming pool having the particular liner. The virtual swimming pool can be a three-dimensional (3D) rendering of a swimming pool with the particular liner. The system can then output the virtual swimming pool for display on a display device.

20 Claims, 10 Drawing Sheets

Related U.S. Application Data continuation of application No. 17/854,006, filed on Jun. 30, 2022, now Pat. No. 11,645,808, which is a continuation of application No. 17/139,822, filed on Dec. 31, 2020, now Pat. No. 11,410,373.

(60) Provisional application No. 62/956,256, filed on Jan. 1, 2020.

(51) Int. Cl.
*G06Q 50/08* (2012.01)
*G06Q 50/16* (2024.01)
*G06T 15/20* (2011.01)
*G06F 111/16* (2020.01)

(56) References Cited

U.S. PATENT DOCUMENTS

| | | |
|---|---|---|
| 10,529,137 B1 | 1/2020 | Black et al. |
| 10,885,701 B1 | 1/2021 | Patel |
| 11,410,373 B2 | 8/2022 | Cappiello et al. |
| 11,645,808 B2 | 5/2023 | Cappiello et al. |
| 2002/0152205 A1 | 10/2002 | Hodam et al. |
| 2003/0190076 A1 | 10/2003 | Delean |
| 2004/0085335 A1 | 5/2004 | Burlnyk et al. |
| 2006/0131382 A1 | 6/2006 | Thatcher |
| 2013/0314421 A1 | 11/2013 | Kim |
| 2014/0258032 A1 | 9/2014 | Psota et al. |
| 2014/0267581 A1 | 9/2014 | Cronin |
| 2014/0272866 A1 | 9/2014 | Kim |
| 2014/0368496 A1 | 12/2014 | Strassenburg-kleciak et al. |
| 2015/0072929 A1 | 3/2015 | Martynov et al. |
| 2015/0294390 A1 | 10/2015 | Fan et al. |
| 2015/0324940 A1* | 11/2015 | Samson ........... G06Q 10/06313 705/7.23 |
| 2016/0092959 A1 | 3/2016 | Gross |
| 2016/0179830 A1 | 6/2016 | Schmalstieg et al. |
| 2017/0109675 A1 | 4/2017 | Hosny et al. |
| 2017/0132841 A1 | 5/2017 | Morrison |
| 2018/0144555 A1 | 5/2018 | Ford et al. |
| 2018/0191769 A1 | 7/2018 | Anderson |
| 2018/0240322 A1 | 8/2018 | Potucek et al. |
| 2019/0114568 A1 | 4/2019 | Ingle |
| 2019/0122279 A1* | 4/2019 | Mordovskoi ...... G06Q 30/0641 |
| 2019/0206048 A1 | 7/2019 | Crabtree |
| 2019/0242692 A1 | 8/2019 | Saure et al. |
| 2019/0266653 A1 | 8/2019 | West et al. |
| 2019/0289276 A1 | 9/2019 | Falstrup et al. |
| 2020/0013103 A1 | 1/2020 | Nair et al. |
| 2020/0184219 A1 | 6/2020 | Mugura et al. |
| 2020/0410576 A1 | 12/2020 | Salmonson |
| 2021/0037174 A1 | 2/2021 | Meganathan et al. |
| 2021/0117071 A1 | 4/2021 | Gharpuray |
| 2021/0142497 A1 | 5/2021 | Pugh et al. |
| 2021/0319914 A1 | 10/2021 | Roh |

OTHER PUBLICATIONS

U.S. Appl. No. 17/139,797, "Non-Final Office Action", Sep. 27, 2021, 13 pages.
U.S. Appl. No. 17/139,822, "Advisory Action", Mar. 1, 2022, 5 pages.
U.S. Appl. No. 17/139,822, "Final Office Action", Dec. 16, 2021, 32 pages.
U.S. Appl. No. 17/139,822, "Non-Final Office Action", Sep. 22, 2021, 31 pages.
U.S. Appl. No. 17/139,822, "Notice of Allowance", Apr. 1, 2022, 13 pages.
U.S. Appl. No. 17/854,006, "Non-Final Office Action", Nov. 25, 2022, 8 pages.
U.S. Appl. No. 17/854,006, "Notice of Allowance", Jan. 18, 2023, 9 pages.
U.S. Appl. No. 18/131,231, "Non-Final Office Action", Jan. 19, 2024, 10 pages.
U.S. Appl. No. 18/131,231, "Notice of Allowance", Mar. 1, 2024, 9 pages.
Nehlich, "Another Brick in the Wall: VizTerra and Pool Studio Version 2.1", Available Online at: https://blog.structurestudios.com/software/website/pool-studio/vizterra-pool-studio-update-2-1, Dec. 4, 2014, 15 pages.
Nehlich, "Easily Draw 3D Swimming Pool Steps and Benches", Structure Studios, Available Online at: https://blog.structurestudios.com/software/easily-draw-3d-swimming-pool-steps-and-benches, Jan. 12, 2018, 16 pages.
Nehlich, "Vip3D Update: Complete Outdoor Living Design Software is Even Better", Available Online at : https://blog.structurestudios.com/software/best-outdoor-living-design-software-is-even-better-vip3d-update, Aug. 10, 2015, pp. 1-17.
Nehlich, "YARD: Augmented Reality for Swimming Pools, Outdoor Kitchens, and Hardscapes", Available Online at : https://blog.structurestudios.com/software/yard-augmented-reality-for-swimming-pools-outdoor-kitchens-and-hardscapes, Apr. 25, 2018, pp. 1-17.
Nobrega et al., "Dynamic Insertion of Virtual Objects in Photographs", International Journal of Creative Interfaces and Computer Graphics, vol. 4, No. 2, Jun. 1, 2013, 18 pages.
PCT/US2020/067723, "International Search Report and Written Opinion", Jul. 6, 2021, 21 pages.
PCT/US2020/067725, "International Preliminary Report on Patentability", Jul. 14, 2022, 8 pages.
PCT/US2020/067725, "International Search Report and Written Opinion", Mar. 26, 2021, 10 pages.
Rapp, "$400k Swimming Pools in 30 Minutes: How Tod Brown Wows His Clients", Available Online at: https://blog.structurestudios.com/software/how-tod-brown-wows-his-clients-with-3d-pool-design, Aug. 24, 2017, 21 pages.
Wang et al., "Cut-and-Fold: Automatic 3D Modeling from a Single Image", IEEE International Conference on Multimedia and Expo Workshops (ICMEW), Jul. 14-18, 2014, 6 pages.

* cited by examiner

VISUALIZER FOR SWIMMING POOLS

CROSS-REFERENCE TO RELATED APPLICATIONS

This is a continuation of U.S. application Ser. No. 18/131,231 filed on Apr. 5, 2023, now allowed, which is a continuation of U.S. application Ser. No. 17/854,006 filed on Jun. 30, 2022, and patented on May 9, 2023 as U.S. Pat. No. 11,645,808, which is a continuation of U.S. application Ser. No. 17/139,822, filed on Dec. 31, 2020, and patented on Aug. 9, 2022 as U.S. Pat. No. 11,410,373, which claims the benefit of priority under 35 U.S.C. § 119 (e) to U.S. Provisional Patent Application No. 62/956,256, filed Jan. 1, 2020, the entirety of each of which is hereby incorporated by reference herein.

TECHNICAL FIELD

The present disclosure relates generally to swimming pools. More specifically, but not by way of limitation, this disclosure relates to a visualizer for swimming pools.

BACKGROUND

Customers generally take into account a variety of considerations when choosing a swimming pool (or "pool") for their property. For example, customers often consider the pool's size, shape, material, and spatial positioning on the property. Customers may also take into account aesthetic considerations, such as the pool's liner pattern and color. Typically, pool manufacturers provide product catalogues that describe their pool products to aid the customer with these considerations. But visualizing what a pool will look like on the property of the customer still requires a great deal of imagination on the part of the customer.

DETAILED DESCRIPTION

Certain aspects and features of the present disclosure relate to visualizing a swimming pool on a property using a pool visualization application. In one particular example, a user may wish to install a swimming pool (or "pool") on his property, such as in his backyard or inside his home. To help visualize what the pool would look like, the user can execute a pool visualization application. The pool visualization application can walk the user through a series of steps, during which the user can select various visual characteristics associated with the pool. Examples of the visual characteristics can include a shape, liner, background setting, material, and orientation for the pool. The pool visualization application can then display a three-dimensional (3D) rendering of a virtual swimming pool, where the 3D rendering has the selected visual characteristics. This can aid the user with visualizing what the pool would look like, so that the user can more easily select an appropriate pool.

In some examples, the pool visualization application can be a website-based application. In some such examples, the virtual swimming pool can be generated within a website displayed in a website browser. At least some of the program code for the pool visualization application can be included in a plugin (e.g., a WordPress plugin), which can be executed by a server hosting the website or a client device accessing the website. In other examples, the pool visualization application can be a mobile application, such as a native application for iPhones® or Android® devices. A user can download the mobile application to a mobile device and execute the mobile application thereon.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
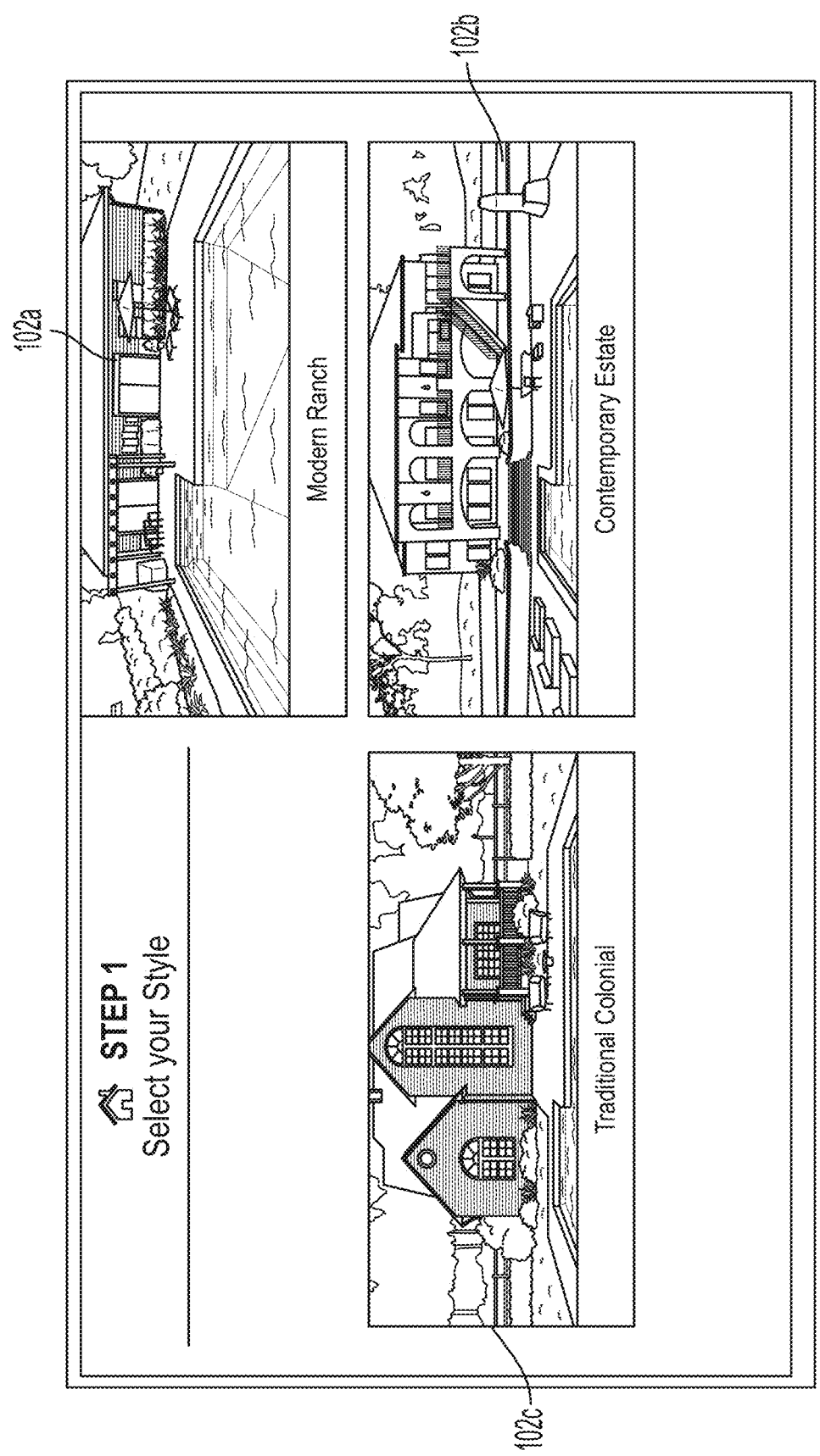
FIGS. 1-6 are screenshots of an example of a pool visualization application according to some aspects of the present disclosure.

FIG. 1 is a screenshot of an example of a pool visualization application according to some aspects of the present disclosure. In this example, the pool visualization application is configured to generate a graphical user interface (GUI) with one or more pages that enable a user to select one or more visual characteristics associated with a virtual swimming pool. The pool visualization application can then display a rendering of the virtual swimming pool, where the rendering has the selected visual characteristic(s).

The screenshot of FIG. 1 depicts one exemplary GUI page of the pool visualization application. This GUI page includes a group of background settings 102*a-c* for a virtual swimming pool. In this example, the group of background settings 102*a-c* includes different types of homes, such as a modern ranch home, a traditional colonial home, and a contemporary estate. But other examples can include more, fewer, or different types of background settings. A user can select a particular background setting from among the group of background settings 102*a-c* to move on to a second GUI page.

Figure 2:
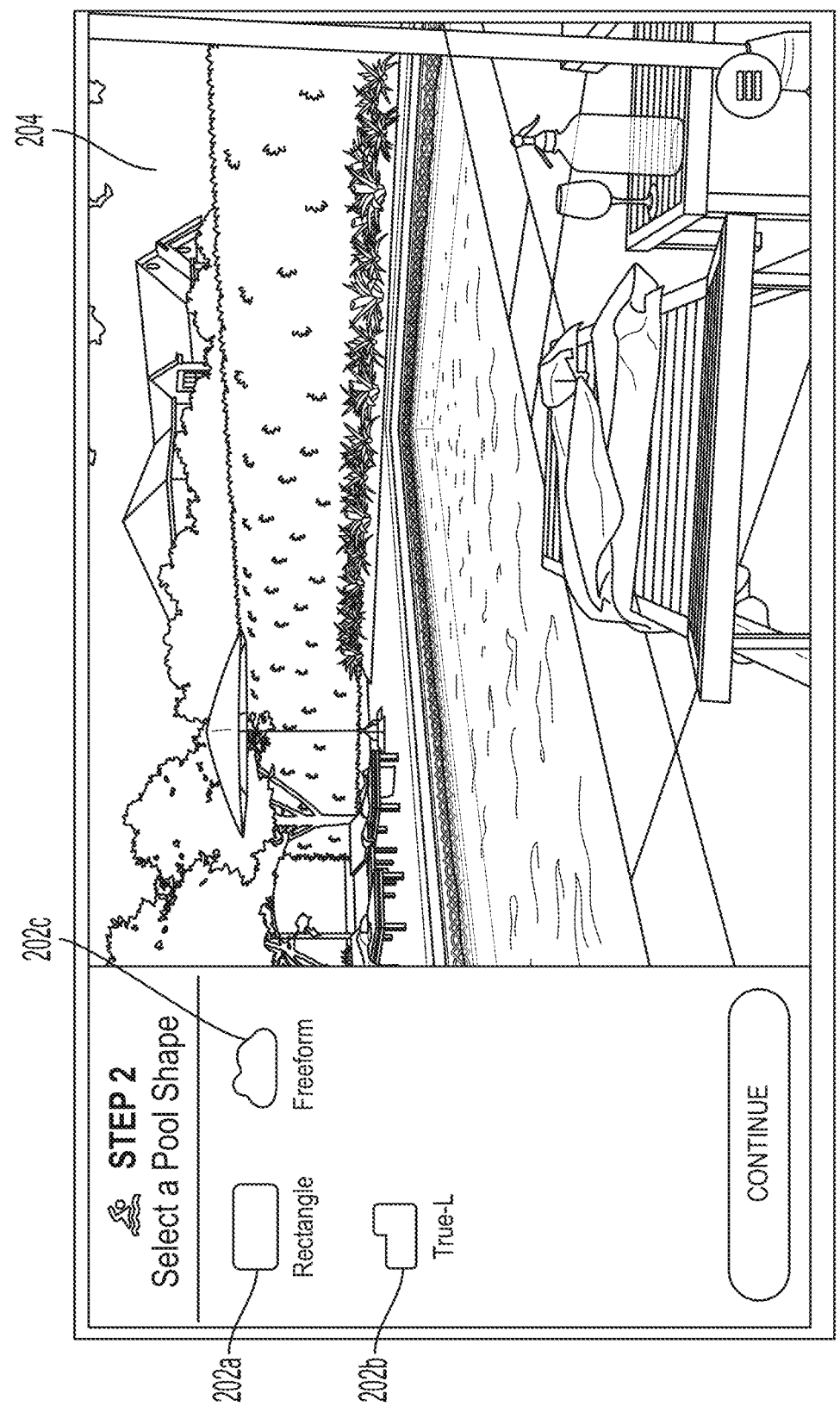

One example of the second GUI page is depicted in FIG. 2. This GUI page includes a group of shapes 202*a-c* for the virtual swimming pool. In this example, the group of shapes 202*a-c* includes a rectangle shape 202*a*, an L shape 202*b*, or a freeform shape 202*c*. But other examples can include more, fewer, or different types of shapes. A user can select a particular shape from among the group of shapes 202*a-c* and the pool visualization application will responsively update a visualization frame 204 to depict a virtual swimming pool having the particular shape within the context of the selected background setting. Once satisfied, the user can select the "continue" button to move on to a third GUI page.

Figure 3:
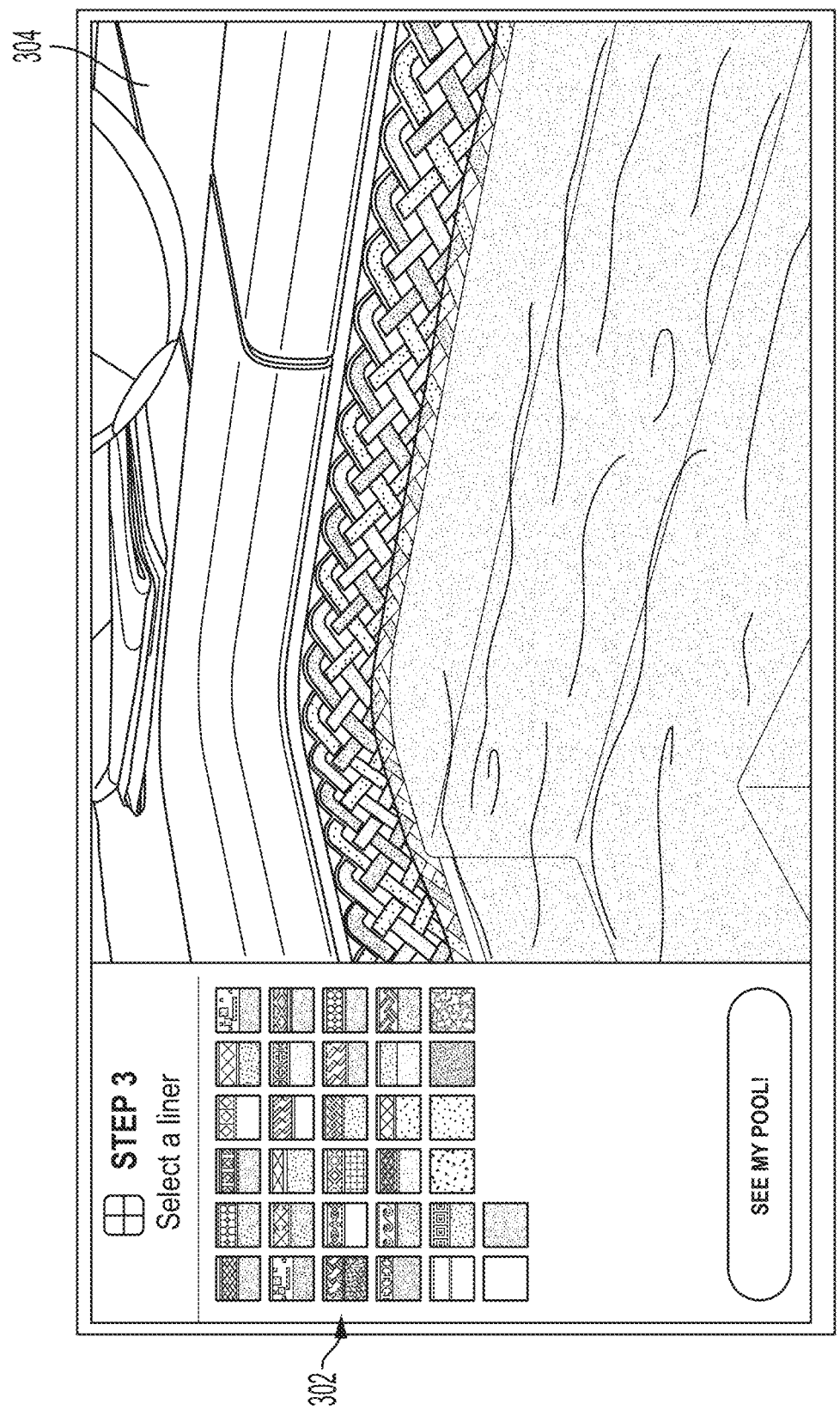

One example of the third GUI page is depicted in FIG. 3. This GUI page includes a group of liner options 302 for the virtual swimming pool. Each liner option can have a unique color palette, pattern, or both. The liner options depicted in FIG. 3 are not intended to be limiting, and other examples may have more, fewer, or different liner options. While the liner options are not listed in any particular order in FIG. 3, other examples can have liner options organized by color palette, pattern, pool water color, etc., and the user may be able to filter through the liner options based on those criteria.

A user can select a particular liner from among the liner options 302 and the pool visualization application will responsively update a visualization frame 304 (e.g., in real time) to depict at least a portion of a virtual swimming pool having the particular liner. The user can also select whether view the particular liner with or without the tiling (e.g., faux tiling) near the water's edge. For example, the user can select a tiling button to view the liner with the tiling, or deselect the tiling button to view the liner without the tiling. Once satisfied, the user can select the "SEE MY POOL!" button to move on to a fourth GUI page.

Figure 4:
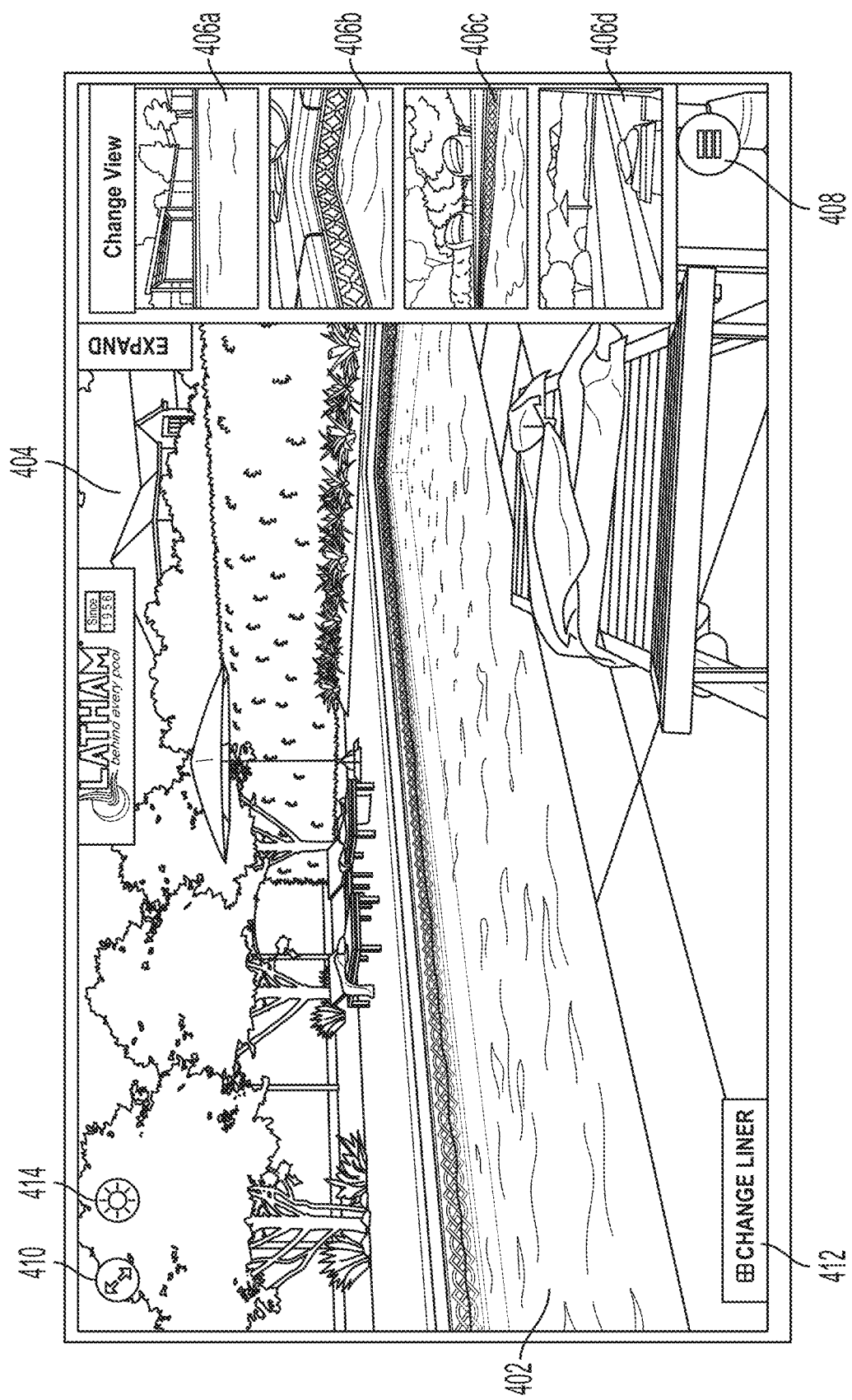

One example of the fourth GUI page is depicted in FIG. 4. This GUI page includes depicts the virtual swimming pool 402 in a visualization frame 404. The virtual swimming pool 402 has the selected shape and liner. The virtual swimming pool 402 is also depicted within the context of the selected background setting (e.g., in a virtual scene having the selected background setting). This can help a user visualize what a swimming pool having the selected visual characteristics may look like.

Figure 5:
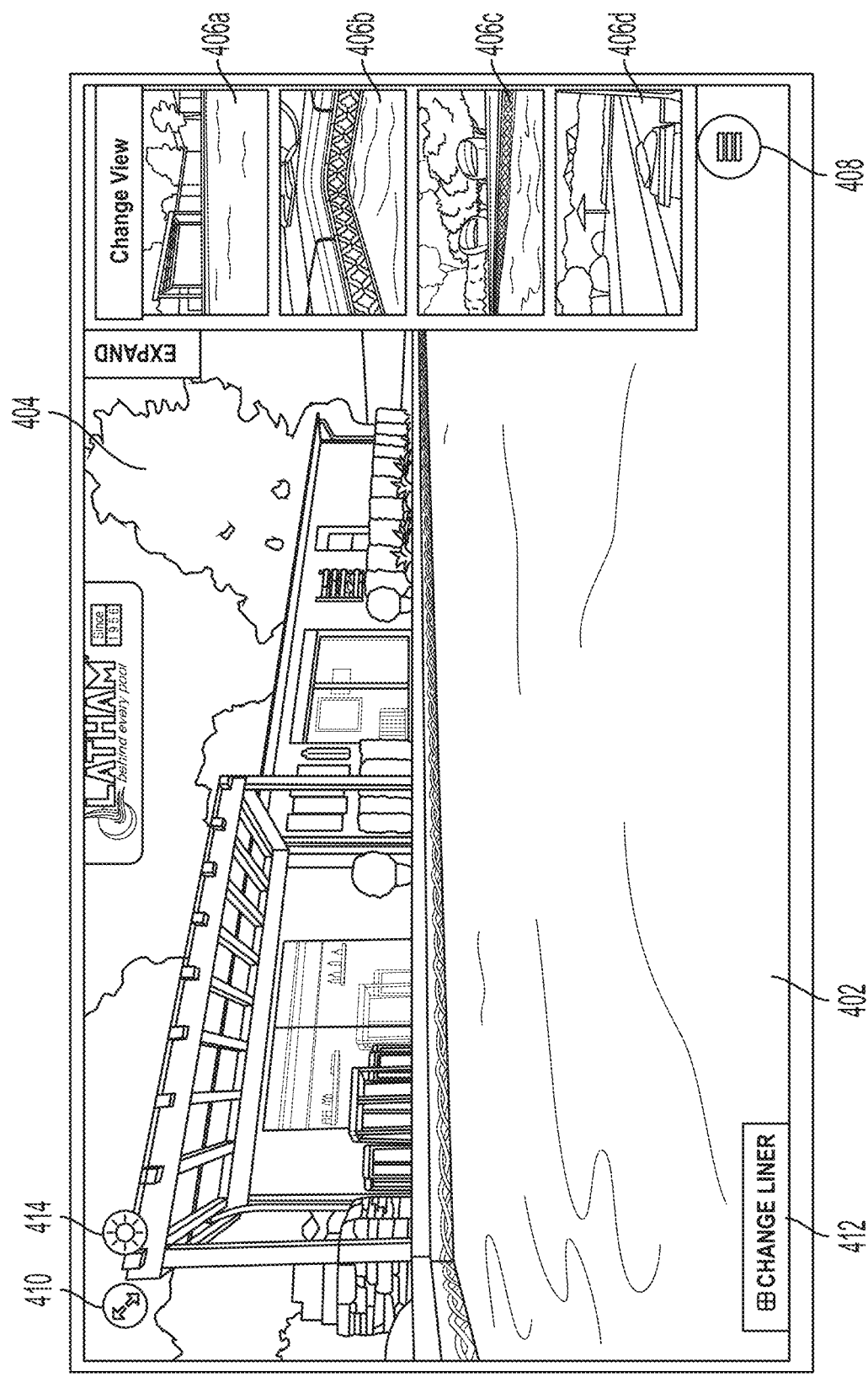
Figure 9:
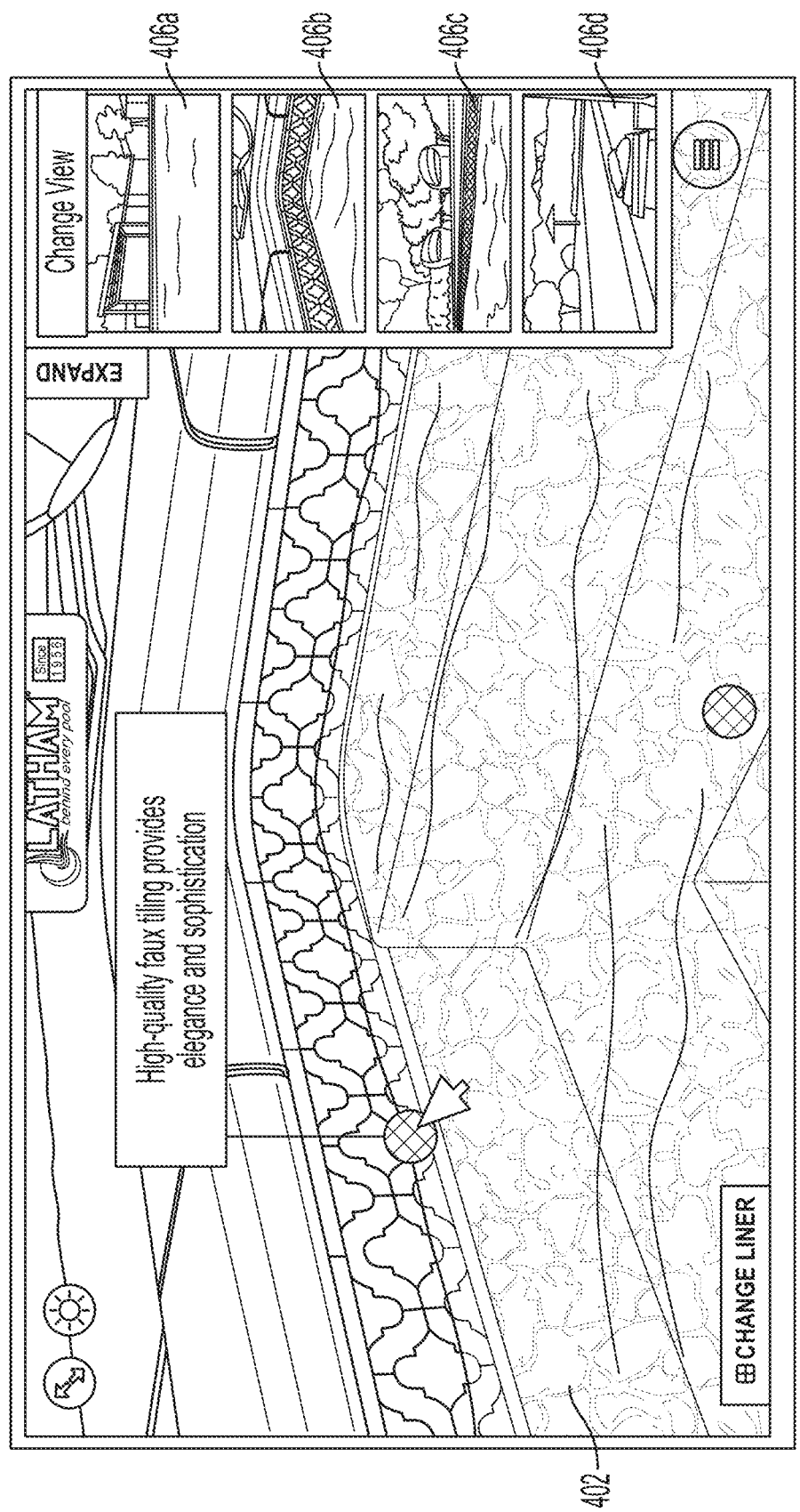
FIG. 9 is a screenshot of an example of a pool visualization application according to some aspects of the present disclosure.

To get a better sense of what the swimming pool might look like from other angles, the pool visualization application can enable the user to select among a group of viewing angle options 406a-d. Each of the viewing angle options 406a-d depicts the virtual swimming pool 402 from a different perspective (e.g., within the selected background setting). One example of viewing angle option 406a is depicted in FIG. 5, which shows the virtual swimming pool 402 from the perspective of a person positioned in the water and looking toward a home in the selected background setting. And one example of viewing angle option 406b is depicted in FIG. 9, which shows a close-up view of the virtual swimming pool 402 near its entryway, to enable a user to more closely inspect how the selected liner might look on the entry stairs of a swimming pool. FIG. 9 also includes hotspots, each of which is designated by a crosshatched circle (but any other suitable visual indicator can alternatively be used). A hotspot is a location with which a user can interact to obtain more information about a corresponding feature of the virtual swimming pool 402. In the example shown in FIG. 9, the user has hovered a cursor over one of the hotspots and the pool visualization application has responsively generated an information box providing more details ("High-quality faux tiling provides elegance and sophistication") about a faux tiling feature corresponding to the hotspot. Although only FIG. 9 depicts hotspots, any of the viewing angle options 406a-d can include one or more hotspots. Returning to FIG. 4, viewing angle option 406c depicts the virtual swimming pool 402 from the perspective of a person positioned in the water and looking in a direction that is opposite to the home in the selected background setting. And viewing angle option 406d is the perspective currently shown in the visualization frame 404 of FIG. 4. But other examples may have more, fewer, or different viewing angle options 406a-d. A user can select a particular viewing angle from among the group of viewing angle options 406a-d and the pool visualization application will responsively update the visualization frame 404 (e.g., in real time) to depict the virtual swimming pool from the selected viewing angle.

In some examples, the fourth GUI page may also include a mode selector 414 that enables a user to activate a day mode or a night mode. In day mode, the pool visualization application depicts the virtual swimming pool 402 at a selected viewing angle during the day time (e.g., with blue skies and sunshine). In night mode, the pool visualization application depicts the virtual swimming pool 402 at the selected viewing angle at night time. Switching between these modes can allow the user to view the virtual swimming pool 402 at different times of day, which can help in the decision-making process. In some examples, the pool visualization application can switch between the modes by accessing a group of pool images (e.g., generated beforehand), where the group of pool images can depict the virtual swimming pool at each viewing angle both during the day and at night. The pool visualization application can then obtain and render the appropriate pool image based on the selected viewing angle and the selected mode.

Some liners can alter the overall color hue of a swimming pool. For example, an installed liner may have properties that interact with the water and sunlight to generate an overall color hue that is perceptibly different from the color of the liner itself. In some examples, the pool visualization application can replicate this phenomenon to provide the user with a more realistic sense of what a swimming pool with the selected liner may look like in the real world. For example, the pool visualization application can determine a color hue for the virtual swimming pool based on water properties such as a depth property, a refraction property, and a reflection property; liner properties such as a color property, a material property, and a pattern property; sun properties such as a position property and a strength property; or any combination of these. The pool visualization application may receive values for some or all of these properties as user input (e.g., through the GUI). Additionally or alternatively, the pool visualization application can have default values for some or all of these properties. For example, the pool visualization application may be preprogrammed with default values for the water depth, refraction, and reflection properties. The pool visualization application may also be preprogrammed with default values for the sun properties. For example, the pool visualization may be preprogrammed with a first set of sun-property values for use in the day mode, whereby the sun is positioned at a first theoretical location in the sky and has a first theoretical strength. The pool visualization may also be preprogrammed with a second set of sun-property values for use in the night mode, whereby the sun is positioned at a second theoretical location in the sky and has a second theoretical strength. The pool visualization application can also have access to a database that correlates each liner option to its respective liner properties. The pool visualization application can access the database to determine the liner properties for the selected liner. After the values for the various properties have been determined, the pool visualization application can determine the color hue for the virtual swimming pool based on the property values, for example by using an algorithm. The pool visualization application can then render the virtual swimming pool with the determined color hue.

The fourth GUI page can also include other GUI objects, such as the menu button 408. The menu button 408 can enable the user to modify the background setting, shape, and liner associated with the virtual swimming pool. For example, the pool visualization application can respond to a user interaction with the menu button 408 by presenting a menu having a first menu option through which a user can change the background setting for the virtual swimming pool 402, a second menu option through which the user can change the shape of the virtual swimming pool 402, and a third menu option through which the user can change the liner for the virtual swimming pool 402 (or choose whether the liner should be depicted with or without the tiling near the water's edge).

In some examples, the menu button 408 can also enable the user to find a supplier of pool products with the visual characteristics of the virtual swimming pool 402. For example, the pool visualization application can detect a user interaction with a menu option for finding a dealer and responsively filter through a list of swimming pool suppliers to identify a group of suppliers that sell pool products with the selected visual characteristics of the virtual swimming pool 402. The pool visualization application can then filter through the group of suppliers based on their proximity to the user (e.g., based on an address or zip code input by the user, or based on a GPS location of the handheld device 100) to identify to a subset of suppliers within a predefined distance of the user. Of course, other examples can perform this filtering process in the opposite order—e.g., by first filtering by proximity and then filtering by product selection. Either way, the pool visualization application can identify appropriate suppliers and output the identified suppliers to the user.

In some examples, the fourth GUI page can also include an expand button 410, which is selectable by a user to enlarge the visualization frame 404 (e.g., to full screen) depicting the virtual swimming pool 402. This may help the user more easily see some of the finer details in the rendering of the virtual swimming pool 402.

Figure 6:
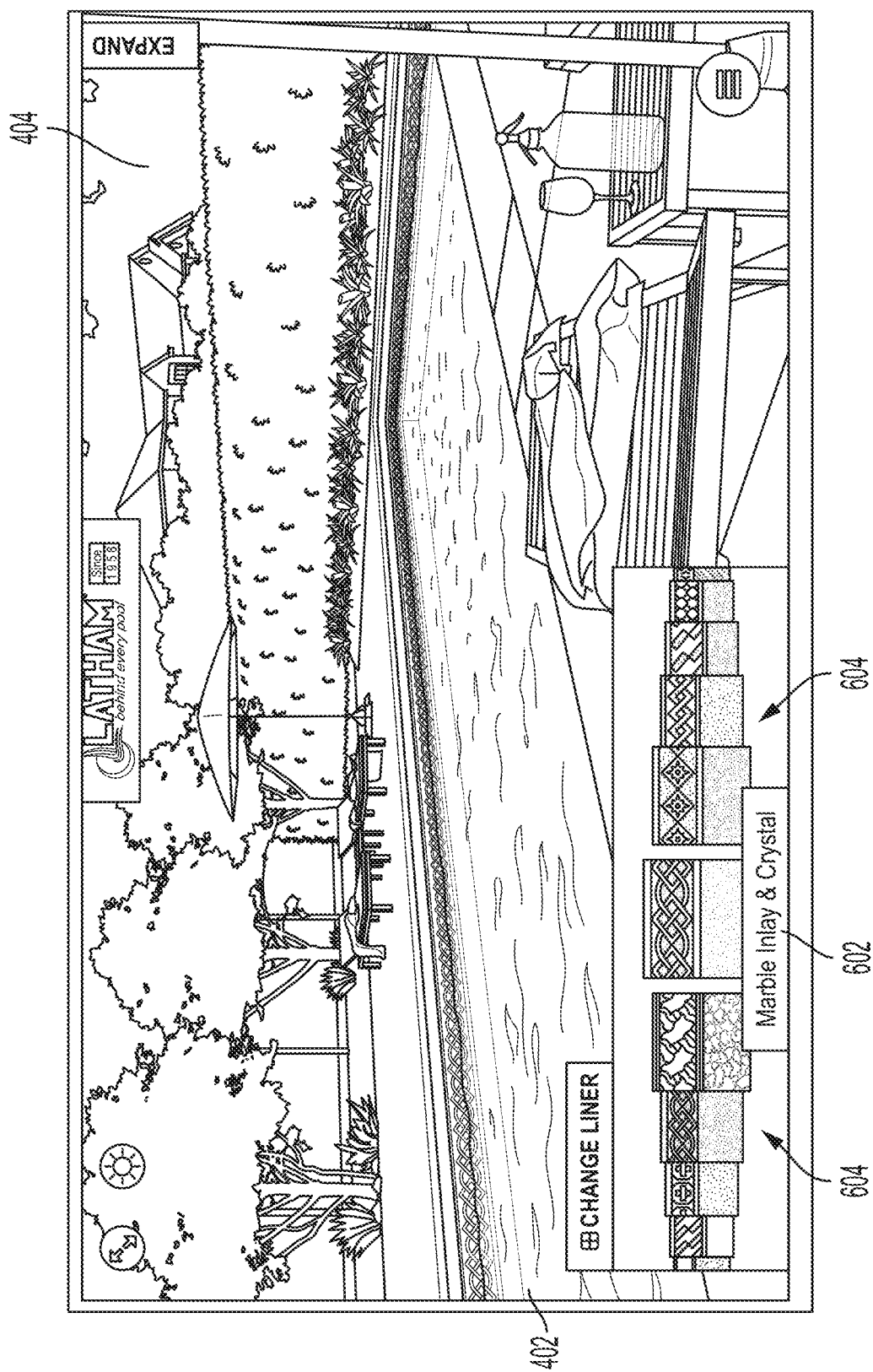

The fourth GUI page can additionally or alternatively include a change liner button 412, through which the user can change the liner for the virtual swimming pool 402. This can serve as an alternative way in which the user can change the liner, which may be easier and faster than having to go through the menu associated with menu button 408. For example, the pool visualization application can detect a user interaction with the change liner button 412 and responsively present an image carousel with a variety of liner options. An example of such an image carousel 602 is shown in FIG. 6. The user can cycle through the various liner options 604 in the image carousel 602 and select a desired liner. The pool visualization application can receive the selected liner and responsively update the virtual swimming pool 402 in the visualization frame 404 to depict the selected liner. The user may also be able to interact with a tiling button to select whether the liner should be depicted with or without the tiling near the water's edge.

In some examples, the fourth GUI page can include a pool cover selector through which a user can select a pool cover for the virtual swimming pool 402. For example, the user can interact with the pool cover selector and the pool visualization application can responsively output a group of pool cover options having varying sizes, shapes, textures, patterns, and colors. In some examples, the pool visualization application can select the group of pool cover options to present to the user based on one or more characteristics (e.g., the size and shape) of the virtual swimming pool, so that the pool cover options conform to those characteristics. A user can select a particular pool cover from among the group of pool cover options and the pool visualization application can responsively update the visualization frame 404 to depict the selected pool cover on the virtual swimming pool 402. This can enable a user to view what the swimming pool would look like when covered, e.g., during winter months.

While FIGS. 1-6 depict a sequence of GUI pages in a particular order having particular GUI objects, these examples are not intended to be limiting. Other examples can involve more, fewer, different, or a different arrangement of GUI pages and GUI objects.

Figure 7:
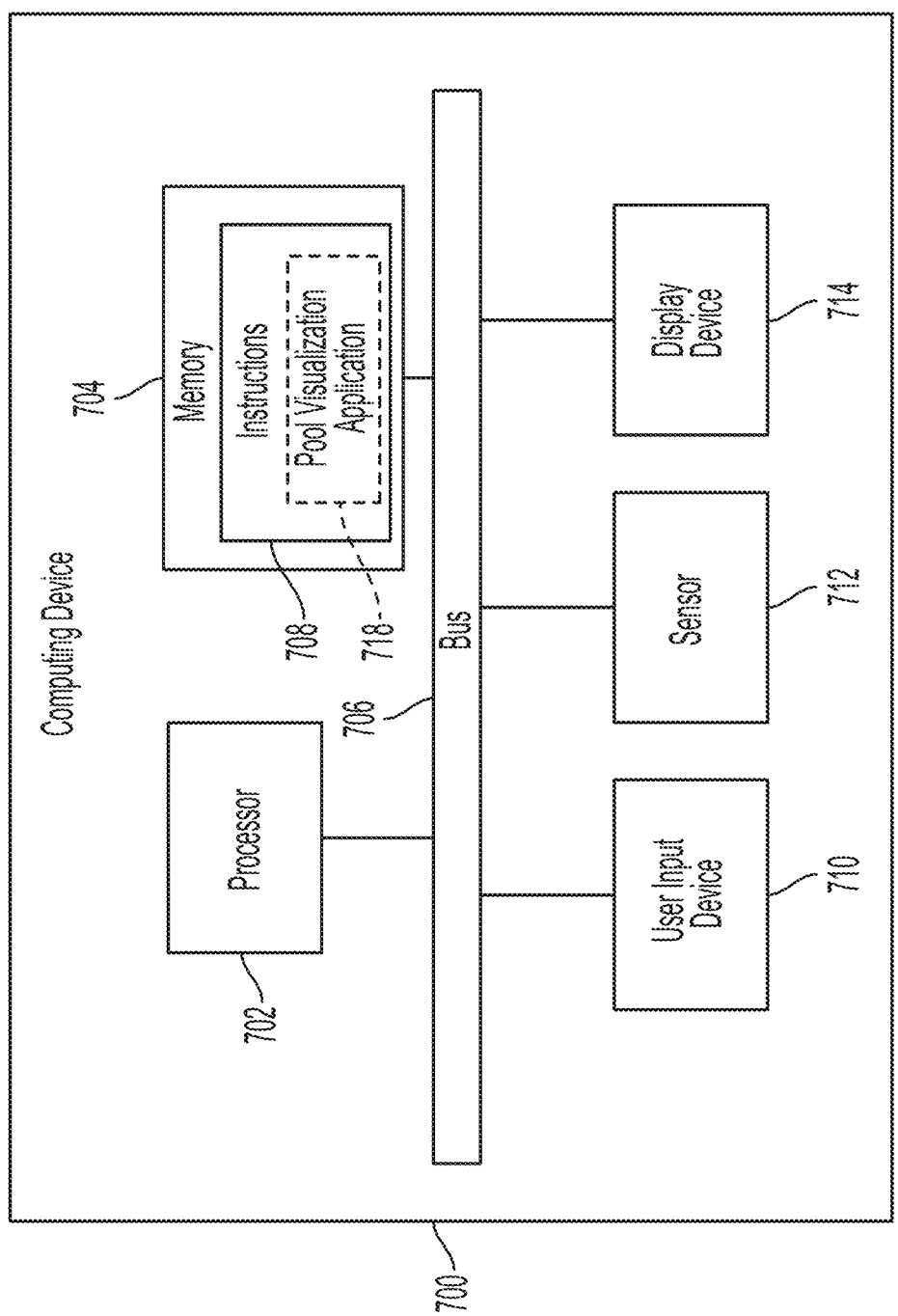
FIG. 7 is a block diagram of an example of a computing device for providing a visualizer for swimming pools according to some aspects of the present disclosure.

As alluded to above, the GUI can be output on a computing device at least in part by executing the pool visualization application. One example of such a computing device 700 is shown in FIG. 7. In some examples, the computing device 700 can be a server, a mobile device (e.g., a mobile phone, tablet, or laptop computer), or a desktop computer.

The computing device 700 includes a processor 702 communicatively coupled to a memory 704 by a bus 706. The processor 702 can include one processor or multiple processors. Non-limiting examples of the processor 702 include a Field-Programmable Gate Array (FPGA), an application-specific integrated circuit (ASIC), a microprocessor, etc. The processor 702 can execute instructions 708 stored in the memory 704 to perform operations. In some examples, the instructions 708 can include processor-specific instructions generated by a compiler or an interpreter from code written in any suitable computer-programming language, such as C, C++, C #, etc.

The memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory device includes a non-transitory computer-readable medium from which the processor 702 can read instructions 708. A non-transitory computer-readable medium can include electronic, optical, magnetic, or other storage devices capable of providing the processor 702 with the instructions 708 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 708.

The instructions 708 can include a pool visualization application 718. The pool visualization application 718 may be executable by the processor 702 for causing the processor 702 to perform any of the functionality described herein. The pool visualization application 718 may also be executable by the processor 702 to perform more functionality, less functionality, or different functionality than described herein.

The computing device 700 also includes input components. One example of an input component is the user input device 710, which may include one user input device or multiple user input devices. Examples of such user input devices can include a mouse, a keyboard, a touchpad, and a touch-screen. Another example of an input component is the sensor 712, which may include one sensor or multiple sensors. Examples of such sensors can include a global positioning system (GPS) unit, a gyroscope, an accelerometer, an inclinometer, and a camera.

The computing device 700 further includes output components. One example of an output component is the display device 714, which may include a liquid crystal display (LCD) or a light-emitting diode (LED) display. The computing device 700 may also include audio output components, like a speaker, and haptic output components, like a haptic actuator. But for simplicity, the audio and haptic output components are not shown in FIG. 7.

While FIG. 7 depicts the components (e.g., processor 702, display device 714, sensor 712, etc.) internal to a single housing, in other examples the components may be distributed and in wired or wireless communication with one another. Additionally, although FIG. 7 depicts a certain number and arrangement of components, this is for illustrative purposes and not intended to be limiting. Other examples can include more components, fewer components, different components, or a different arrangement of the components shown in FIG. 7.

Figure 8:
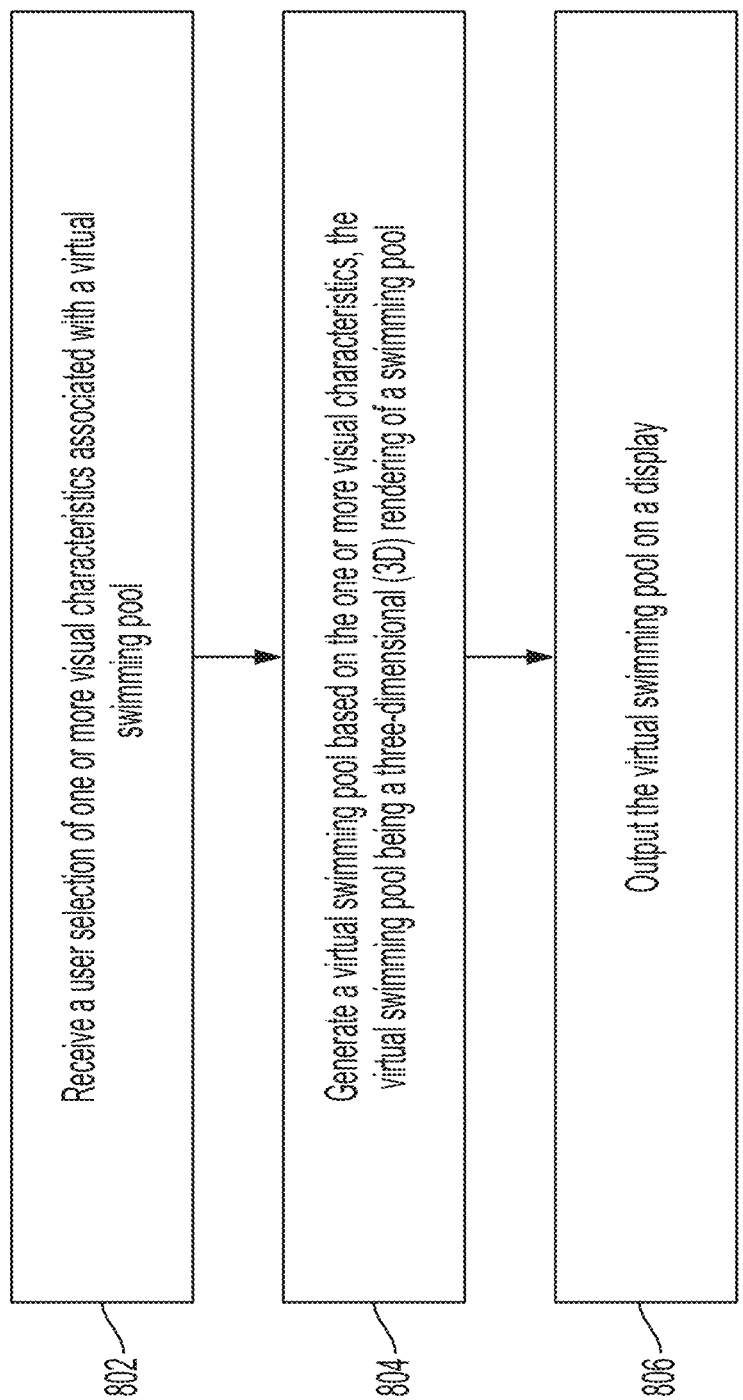
FIG. 8 is a flow chart of an example of a process for providing a visualizer for swimming pools according to some aspects of the present disclosure.

FIG. 8 is a flow chart of an example of a process for providing a visualizer for swimming pools according to some aspects of the present disclosure. While FIG. 8 depicts a certain sequence of steps for illustrative purposes, other examples can involve more steps, fewer steps, different steps, or a different order of the steps depicted in FIG. 8. The steps of FIG. 8 are described below with reference to components of FIG. 7 described above.

In block 802, a processor 702 receives a user selection of one or more visual characteristics associated with a virtual swimming pool. Examples of the visual characteristics can include a background setting, a liner, a shape, a viewing angle, an orientation, a material, or any combination of these. For example, the processor 702 can output thumbnail images of a plurality of liner options in a GUI on a display device 714. The processor 702 can then detect a user selection of a thumbnail image corresponding to a particular liner among the plurality of liner options.

In block 804, the processor 702 generates a virtual swimming pool based on the one or more visual characteristics selected by the user. The virtual swimming pool is a three-dimensional (3D) rendering of a swimming pool. The processor 702 can generate the virtual swimming pool using any number of combination of techniques. Two example techniques are described below.

One exemplary technique can involve the processor 702 identifying a particular pool image from among a group of pool images based on the one or more visual characteristics selected by the user. For example, a group of pool images may have been generated beforehand using a 3D rendering tool, such as V-Ray. Each of the pool images can have a unique combination of visual characteristics, such as a unique combination of a background setting, a liner, a viewing angle, a pool shape, or any combination of these. For instance, if there are 3 options for background settings, 4 viewing angle options for each background setting, 20 liner options, and 3 options for pool shape, then there may be 3×4×20×3=720 total images in the group, to cover every possible combination of these options. The processor 702 can determine which particular pool image has the one or more visual characteristics selected by the user, access a repository in which the group of pool images are stored, and retrieve the particular pool image from the repository. The processor 702 can then generate the virtual swimming pool using the particular pool image.

Another exemplary technique can involve the processor 702 using a layered approach, in which the processor 702 can generate the virtual swimming pool by overlaying images on top of one another. For example, the processor 702 can identify a background image having the background setting and viewing angle selected by the user, access a repository of background images, and retrieve the identified background image. The processor 702 can also identify a pool image having the shape and viewing angle selected by the user, access a repository of pool images, and retrieve the identified pool image. The processor 702 can further identify a liner image having the liner and viewing angle selected by the user, access a repository of liner images, and retrieve the identified liner image. The background, pool, and liner repositories can be a single repository or different repositories. The processor 702 can then overlay the pool image overtop of the background image, and overlay the liner image overtop of the pool image. This can yield a virtual scene with a virtual swimming pool, whereby the virtual scene and virtual swimming pool have the one or more visual characteristics selected by the user. This technique may require the generation of significantly fewer images upfront than the first technique discussed above. For example, if there are 3 options for background settings, 4 viewing angle options for each background setting, 20 liner options, and 3 options for pool shape, then there may only need to be (3×4)+(20×4)+(3×4)=104 total images to cover every possible combination of these options.

In some examples, the second technique discussed above may also result in faster updating than the first technique discussed above. For example, after the virtual swimming pool is initially displayed, the user may decide that he does not like a visual characteristic that he has previously selected. So, the user may provide user input to modify (e.g., update) a visual characteristic associated with the virtual swimming pool, such as the liner. The processor 702 can receive the user input and responsively modify the visual characteristic by changing one of the image layers (e.g., by switching the liner image for another liner image) rather than the entire image, which can be significantly faster than updating an entire image.

In block 806, the processor 702 outputs the virtual swimming pool for display on a display device, such as on display device 714. Outputting the virtual swimming pool for display can involve transmitting one or more electronic communications (e.g., over the Internet) configured for causing the virtual swimming pool to be displayed on the display device. For example, the processor 702 can be part of a server in communication with a client device. The server can transmit one or more electronic communications over the Internet to the client device. The one or more electronic communications can be configured for causing the virtual swimming pool to be displayed on a display device of the client device. As another example, the processor 702 can generate and transmit one or more display signals to the display 714 for causing the display to output the virtual swimming pool.

Figure 10:
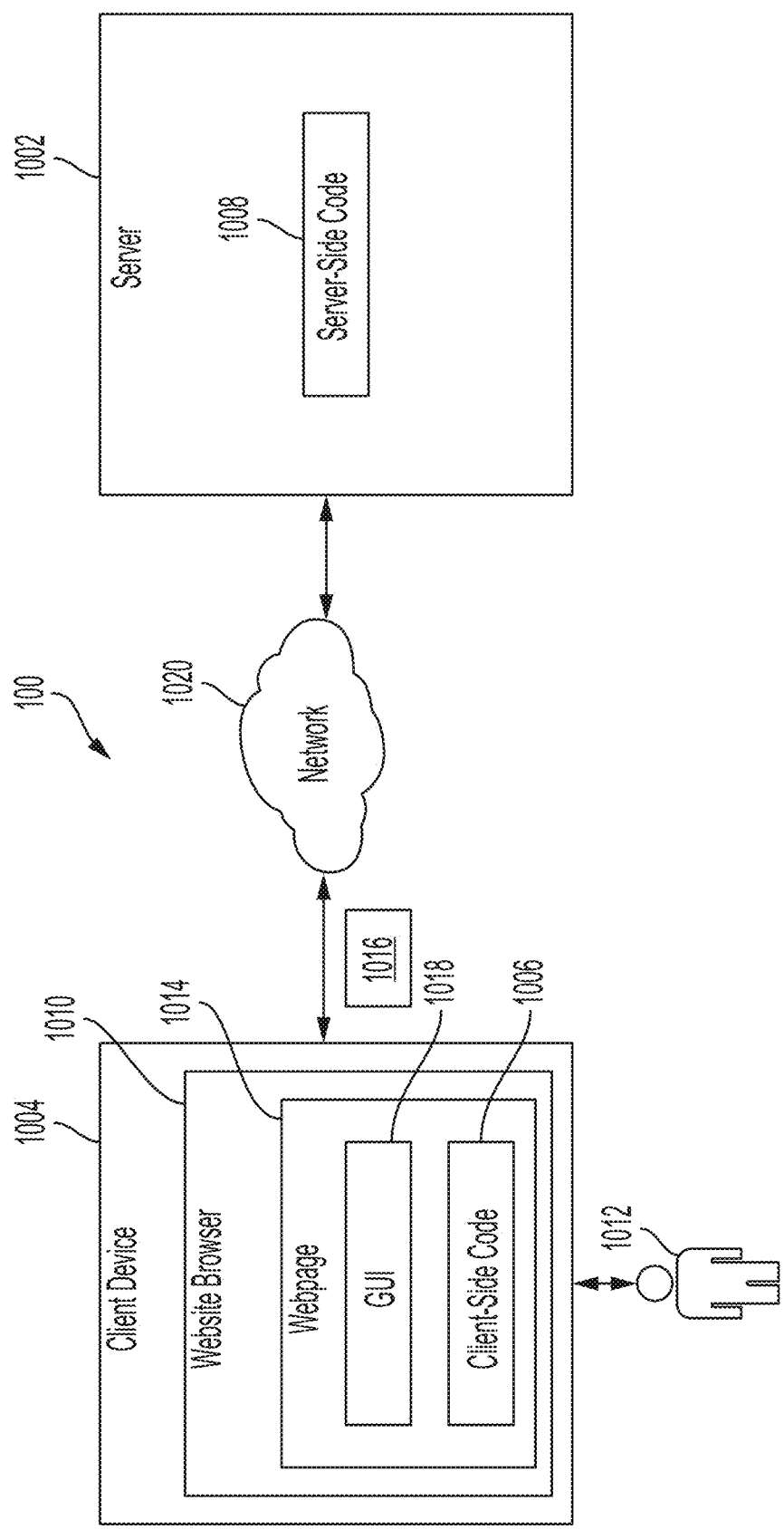
FIG. 10 is a block diagram of an example of a system for implementing a pool visualization application according to some aspects of the present disclosure.

FIG. 10 is a block diagram of an example of a system 1000 for implementing a pool visualization application according to some aspects of the present disclosure. The system 1000 includes a server 1002 that may include some or all of the components discussed above with respect to FIG. 7, such as the processor 702 and the memory 704. The server 1002 is in communication with a client device 1004 via a network 1020, such as the Internet. Examples of the client device 1004 can include a desktop computer or a mobile device, such as a laptop computer, a tablet, or mobile phone. The server 1002 can include at least part of a pool visualization application, such as pool visualization application 718, for implementing some aspects described herein.

In some examples, the pool visualization application can include client-side code 1006 and server-side code 1008 that can work together in a client-server architecture to implement some or all of the functionality described herein. The client-side code 1006 can be program code configured to be delivered to and run by the client device 1004. Examples of the program code can include hypertext markup language (HTML) code, Javascript code, JQuery code, Cascading Style Sheet (CSS) code, C++ code, Java code, Objective-C code, Python code, or any combination of these. In the example of FIG. 10, the client-side code 1006 is transmitted to the client device 1004 as part of a webpage 1014. The client-side code 1004 is run (e.g., executed or interpreted) by a website browser 1010 of the client device 1004 for rendering the webpage 1014 with an interactive GUI 1018 for visualizing a swimming pool on a property. An example of such a GUI 10818 is the GUI described above with reference to FIGS. 1-6. But in other examples, the client-side code 1006 may be a standalone software application configured to execute outside the context of a website browser 1010. Any suitable implementation of client-side code 1006 may be used to generate an interactive GUI 1018 for implementing some or all of the functionality described herein.

The server-side code 1008 can include program code configured to be run by the server 1002. Examples of the program code can include PHP code, Python code, C++ code, Java code, or any combination of these. The server-side code 1008 can be configured to interact with the client-side code 1006 to generate the GUI 1018.

In some examples, a user 1012 of the client device 1004 can interact with the GUI 1018 by supplying input to the client device 1004. The client-side code 1006 can receive the user input and responsively transmit requests 1016 (e.g., REST requests) to the server-side code 1008 of the server 1002. The requests 1016 can be configured for effectuating some or all of the functionality described herein. For example, the client-side code 1006 can receive user selections of a liner, background setting, and shape for the virtual swimming pool and responsively transmit requests 1016 indicating these selections to the server-side code 1008. The server-side code 1008 can receive such requests 1016 and responsively perform one or more operations based on the requests 1016. For example, the server-side code 1008 can generate or update the GUI 1018 to depict a virtual scene with a virtual swimming pool in accordance with the user selections.

Although FIG. 10 depicts a certain number and arrangement of components, other examples can include more components, fewer components, different components, or a different arrangement of the components shown in FIG. 10. For example, multiple servers or services (e.g., microservices or serverless functions) may work together to collectively implement some or all of the server-side functionality associated with the server-side code 1008 in the client-server architecture described above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
one or more processors; and
one or more memories including instructions that are executable by the one or more processors for causing the one or more processors to:
receive a selection, from a user, of a particular pool cover from among a plurality of pool covers;
identify a pre-rendered pool image having the particular pool cover selected by the user from among a plurality of pre-rendered pool images, wherein each pre-rendered pool image in the plurality of pre-rendered pool images depicts a respective pool cover that is different than the other pre-rendered pool images in the plurality of pre-rendered pool images; and
output the pre-rendered pool image for display on a display device, the pre-rendered pool image including a virtual swimming pool that has the particular pool cover selected by the user.

2. The system of claim 1, wherein the one or more memories further include instructions that are executable by the one or more processors for causing the one or more processors to:
based on identifying the pre-rendered pool image having the particular pool cover selected by the user, receive the pre-rendered pool image from a repository storing the plurality of pre-rendered pool images.

3. The system of claim 1, wherein the one or more memories further include instructions that are executable by the one or more processors for causing the one or more processors to:
receive user input for modifying the virtual swimming pool to have another pool cover that is different from the particular pool cover;
based on receiving the user input, identify another pre-rendered pool image, from among the plurality of pre-rendered pool images, that depicts the virtual swimming pool as having the other pool cover; and
output the other pre-rendered pool image for display on the display device.

4. The system of claim 1, wherein the one or more memories further include instructions that are executable by the one or more processors for causing the one or more processors to:
receive user input for modifying a shape associated with the virtual swimming pool from a first shape to a second shape;
based on receiving the user input, identify another pre-rendered pool image, from among the plurality of pre-rendered pool images, that depicts the virtual swimming pool as having the second shape and the particular pool cover; and
output the other pre-rendered pool image for display on the display device.

5. The system of claim 1, wherein the pre-rendered pool image depicts the virtual swimming pool at a first viewing angle, and wherein the one or more memories further include instructions that are executable by the one or more processors for causing the one or more processors to:
receive user input for modifying a viewing angle associated with the virtual swimming pool from the first viewing angle to a second viewing angle;
based on receiving the user input, identify another pre-rendered pool image, from among the plurality of pre-rendered pool images, that depicts the virtual swimming pool from the second viewing angle and as having the particular pool cover; and
output the other pre-rendered pool image for display on the display device.

6. The system of claim 1, wherein the one or more memories further include instructions that are executable by the one or more processors for causing the one or more processors to:
output an image depicting the virtual swimming pool as part of a website.

7. The system of claim 1, wherein the one or more memories further include instructions that are executable by the one or more processors for causing the one or more processors to:

receive a user selection of a particular pool cover, from among a plurality of pool cover options, for the virtual swimming pool; and output an image depicting the virtual swimming pool with the particular pool cover thereon for display on the display device.

8. A method comprising:

receiving, by one or more processors and from a user, a selection of a particular pool cover from among a plurality of pool covers;

identifying, by the one or more processors, a pre-rendered pool image having the particular pool cover selected by the user from among a plurality of pre-rendered pool images, wherein each pre-rendered pool image in the plurality of pre-rendered pool images depicts a respective pool cover that is different than the other pre-rendered pool images in the plurality of pre-rendered pool images; and outputting, by the one or more processors, the pre-rendered pool image for display on a display device, the pre-rendered pool image including a virtual swimming pool that has the particular pool cover selected by the user.

9. The method of claim 8, further comprising:

based on identifying the pre-rendered pool image having the particular pool cover selected by the user, receiving the pre-rendered pool image from a repository storing the plurality of pre-rendered pool images.

10. The method of claim 8, further comprising:

receiving user input for modifying the virtual swimming pool to have another pool cover that is different from the particular pool cover;

based on receiving the user input, identifying another pre-rendered pool image, from among the plurality of pre-rendered pool images, that depicts the virtual swimming pool as having the other pool cover; and outputting the other pre-rendered pool image for display on the display device.

11. The method of claim 8, further comprising:

receiving user input for modifying a shape associated with the virtual swimming pool from a first shape to a second shape;

based on receiving the user input, identifying another pre-rendered pool image, from among the plurality of pre-rendered pool images, that depicts the virtual swimming pool as having the second shape and the particular pool cover; and outputting the other pre-rendered pool image for display on the display device.

12. The method of claim 8, wherein the pre-rendered pool image depicts the virtual swimming pool at a first viewing angle, and further comprising:

receiving user input for modifying a viewing angle associated with the virtual swimming pool from the first viewing angle to a second viewing angle;

based on receiving the user input, identifying another pre-rendered pool image, from among the plurality of pre-rendered pool images, that depicts the virtual swimming pool from the second viewing angle and as having the particular pool cover; and outputting the other pre-rendered pool image for display on the display device.

13. The method of claim 8, further comprising:

outputting an image depicting the virtual swimming pool as part of a website.

14. The method of claim 8, further comprising:

receiving a user selection of a particular pool cover, from among a plurality of pool cover options, for the virtual swimming pool; and in response to receiving the user selection, outputting an image depicting the virtual swimming pool with the particular pool cover thereon for display on the display device.

15. A non-transitory computer-readable medium comprising program code that is executable by one or more processors for causing the one or more processors to:

receive a selection by a user of a particular pool cover from among a plurality of pool covers;

identify a pre-rendered pool image having the particular pool cover selected by the user from among a plurality of pre-rendered pool images, wherein each pre-rendered pool image in the plurality of pre-rendered pool images depicts a respective pool cover that is different than the other pre-rendered pool images in the plurality of pre-rendered pool images; and output the pre-rendered pool image for display on a display device, the pre-rendered pool image including a virtual swimming pool that has the particular pool cover selected by the user.

16. The non-transitory computer-readable medium of claim 15, further comprising program code that is executable by the one or more processors for causing the one or more processors to:

based on identifying the pre-rendered pool image having the particular pool cover selected by the user, receive the pre-rendered pool image from a storage location that includes the plurality of pre-rendered pool images.

17. The non-transitory computer-readable medium of claim 15, further comprising program code that is executable by the one or more processors for causing the one or more processors to:

receive user input for modifying the virtual swimming pool to have another pool cover that is different from the particular pool cover; and based on receiving the user input, output an image depicting the virtual swimming pool with the other pool cover for display on the display device.

18. The non-transitory computer-readable medium of claim 15, further comprising program code that is executable by the one or more processors for causing the one or more processors to:

receive user input for modifying a shape associated with the virtual swimming pool from a first shape to a second shape; and based on receiving the user input, output an image depicting the virtual swimming pool with the second shape for display on the display device.

19. The non-transitory computer-readable medium of claim 15, wherein the pre-rendered pool image depicts the virtual swimming pool at a first viewing angle, and further comprising program code that is executable by the one or more processors for causing the one or more processors to:

receive user input for modifying a viewing angle associated with the virtual swimming pool from the first viewing angle to a second viewing angle; and in response to receiving the user input, output an image depicting the virtual swimming pool at the second viewing angle for display on the display device.

20. The non-transitory computer-readable medium of claim 15, wherein a mobile application is configured to output the pre-rendered pool image for display on the display device.

* * * * *